N. C. WHITING.
MOTOR TRICYCLE.
APPLICATION FILED OCT. 26, 1911.

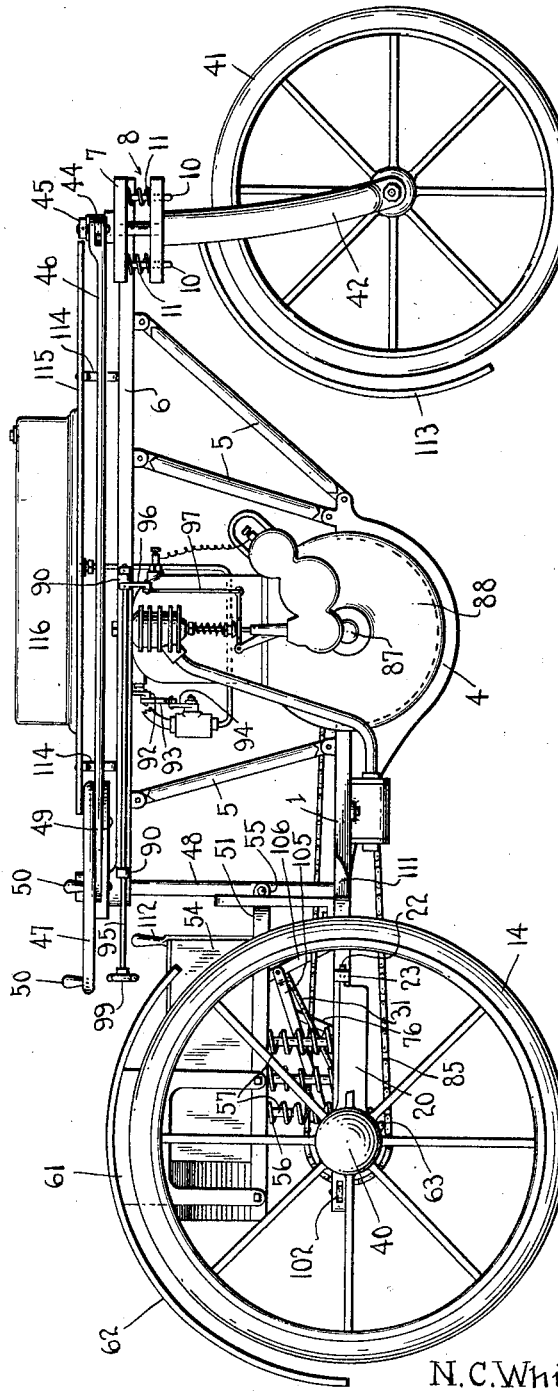

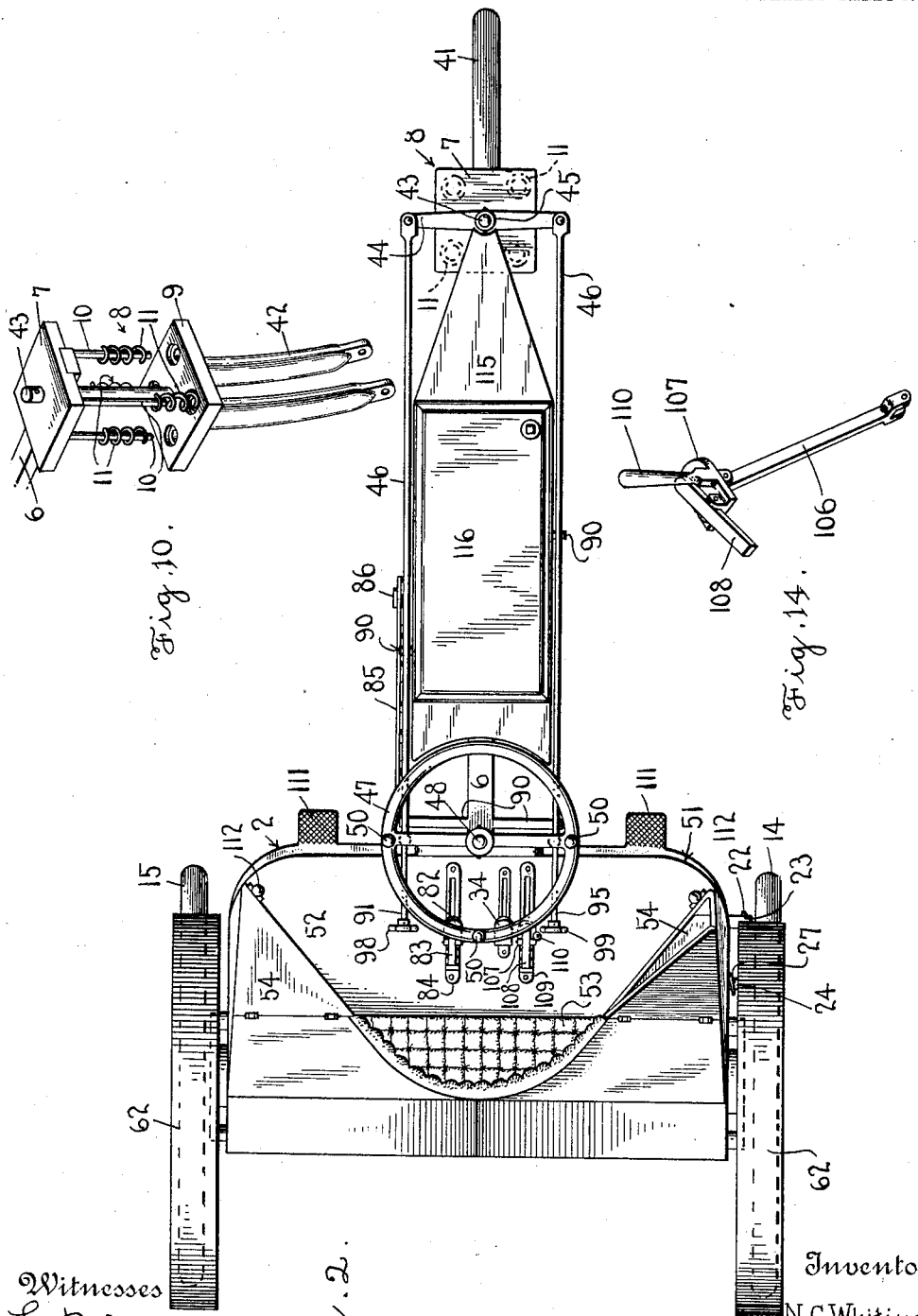

1,055,960.

Patented Mar. 11, 1913.
5 SHEETS—SHEET 3.

Witnesses
L. B. James
C. E. Hunt

Inventor
N. C. Whiting
by H. B. Willson & Co.
Attorneys

N. C. WHITING.
MOTOR TRICYCLE.
APPLICATION FILED OCT. 26, 1911.
1,055,960.
Patented Mar. 11, 1913.
5 SHEETS—SHEET 4.
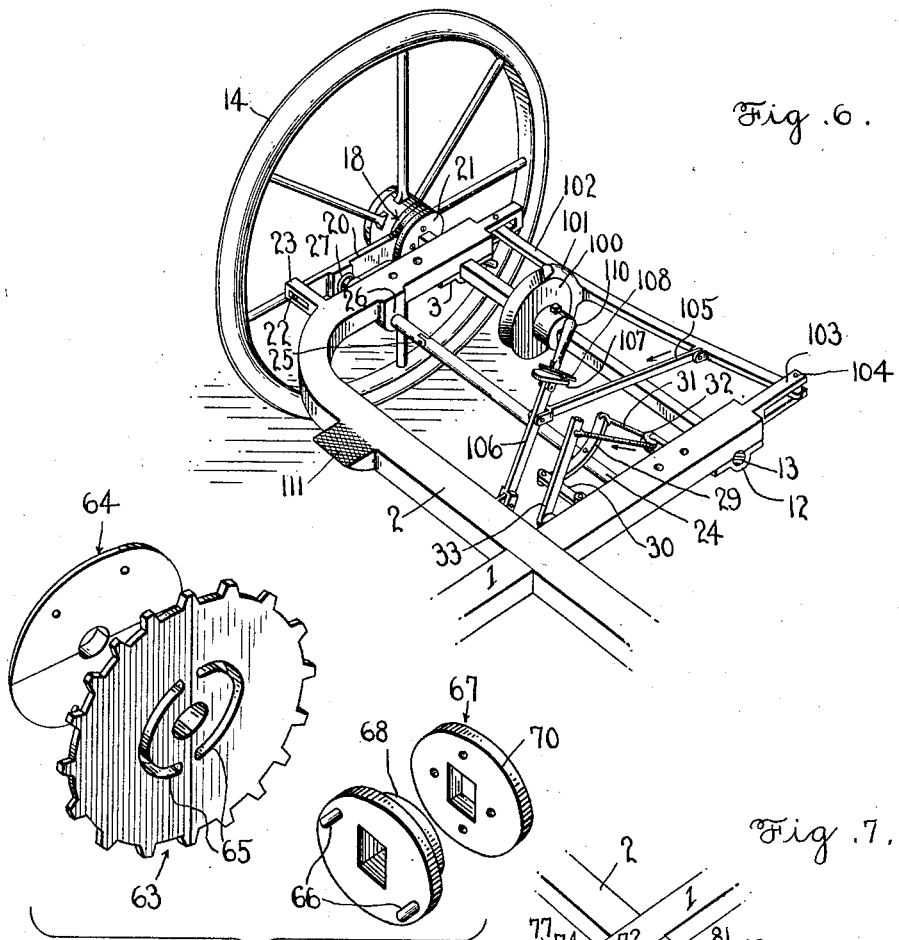
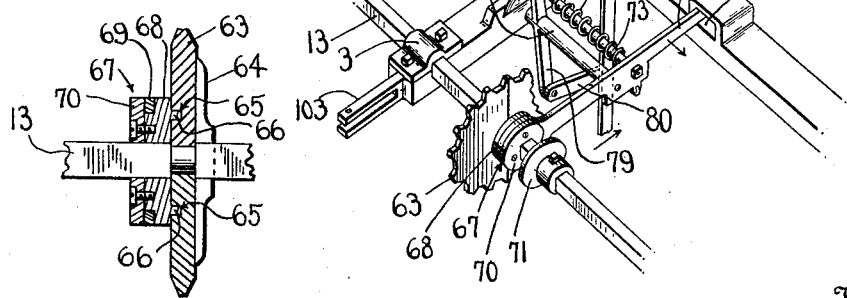

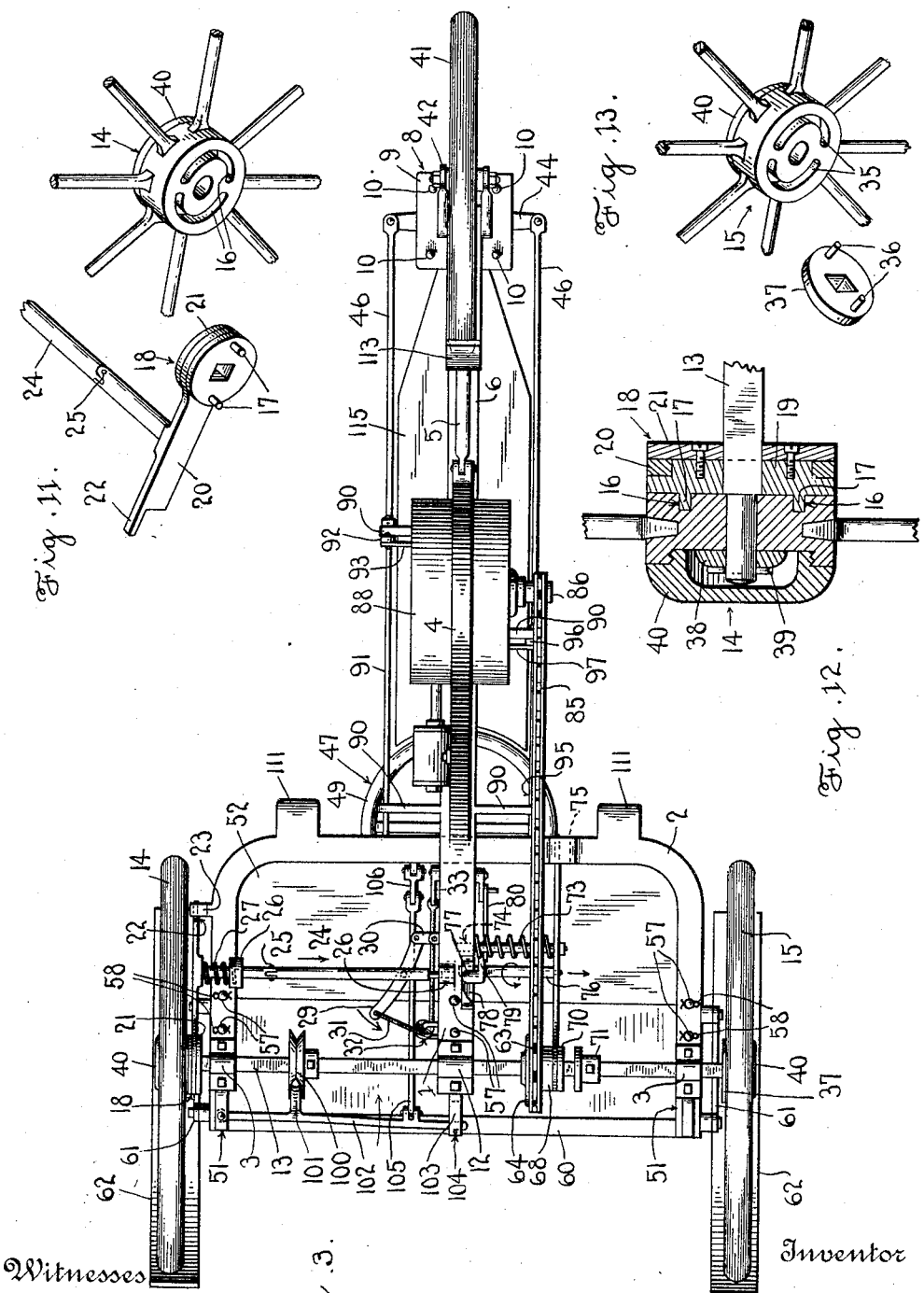

UNITED STATES PATENT OFFICE.

NATHAN C. WHITING, OF GLOUSTER, OHIO, ASSIGNOR OF ONE-FOURTH TO C. C. HAIRSTON, OF GLOUSTER, OHIO.

MOTOR-TRICYCLE.

1,055,960.  Specification of Letters Patent.  Patented Mar. 11, 1913.

Application filed October 26, 1911. Serial No. 656,951.

*To all whom it may concern:*

Be it known that I, NATHAN C. WHITING, a citizen of the United States, residing at Glouster, in the county of Athens and State of Ohio, have invented certain new and useful Improvements in Motor-Tricycles; and I do declare the following to be a full, clear, and exact description of the invention, such as will enable others skilled in the art to which it appertains to make and use the same.

This invention relates to improvements in motor tricycles.

One object of the invention is to provide a motor driven tricycle having an improved construction and arrangement of supporting mechanism for yieldingly supporting the seat and working parts of the machine.

Another object is to provide an improved construction and arrangement of driving mechanism and means whereby the same may be readily controlled by the driver or occupant of the machine.

A further object is to provide an improved construction and arrangement of steering mechanism and engine controlling devices whereby these parts are readily controlled by the operator.

With these and other objects in view the invention consists of certain novel features of construction, and the combination and arrangement of parts as will be more fully described and claimed.

Figure 4:
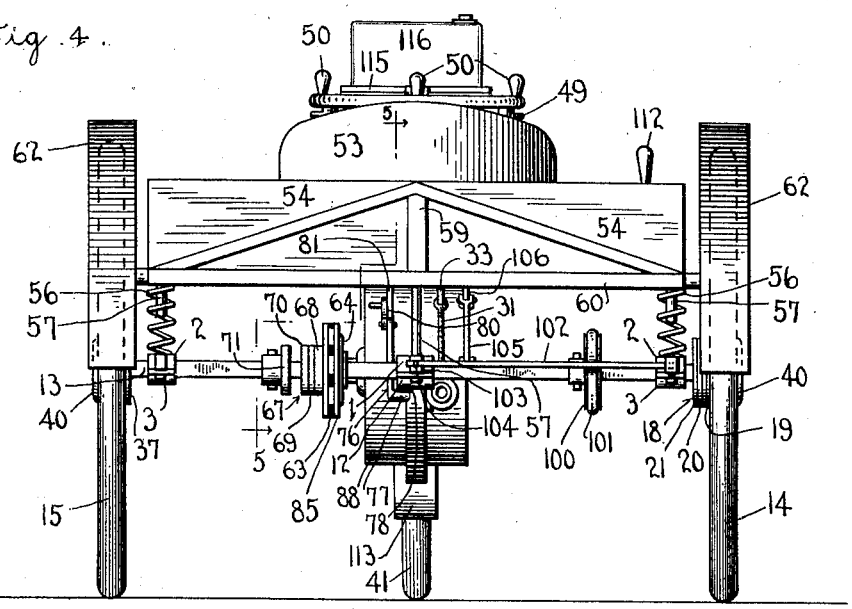
Figure 5:
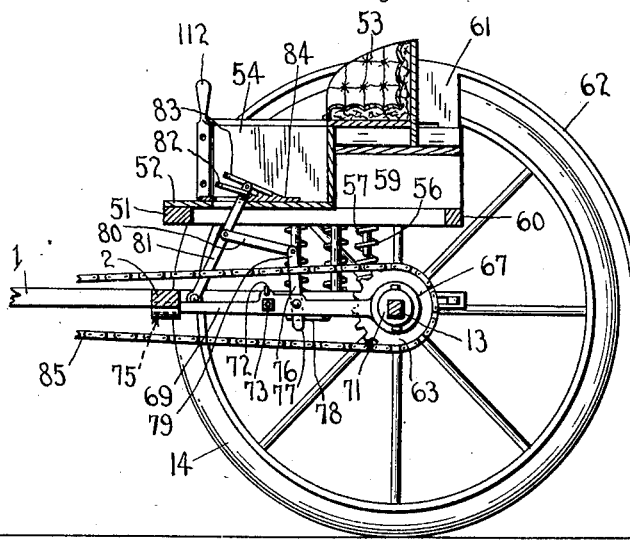

In the accompanying drawings; Figure 1 is a side view of my improved motor tricycle; Fig. 2 is a top plan view; Fig. 3 is a bottom plan view; Fig. 4 is a rear end view; Fig. 5 is a vertical sectional view through the rear portion of the machine taken on the line 5—5 of Fig. 4; Fig. 6 is a detail perspective view of a portion of the axle and supporting frame showing the construction and arrangement of the brake and the means for operating the same; Fig. 7 is an inverted perspective view of a portion of an axle and supporting frame showing the construction and arrangement of the driving gear and the clutch mechanism for throwing the same into and out of operation; Fig. 8 is a vertical sectional view through the master sprocket or driving gear and the clutch mechanism for throwing the same into and out of operative engagement with the axle of the machine. Fig. 9 is a detail perspective view of the master sprocket and the parts of the clutch mechanism whereby the same is thrown into and out of operation; Fig. 10 is a detail perspective view of the head and steering fork of the machine; Fig. 11 is a similar view of the hub of the right hand supporting and driving wheel and the clutch mechanism whereby the same is locked into operative engagement with the axle; Fig. 12 is an enlarged sectional view through the hub and clutch mechanism shown in Fig. 11; Fig. 13 is a view similar to Fig. 11 illustrating the construction of the hub of the left hand supporting wheel and its clutch mechanism; Fig. 14 is a detail perspective view of the combined hand and foot lever for actuating the brake operating mechanism.

In the embodiment of the invention, I provide a main supporting frame comprising a horizontally disposed center bar 1 to which is secured a bearing frame 2 having on its side members, axle bearings 3. To the forward end of the center bar 1 is secured an engine seat 4, said seat and the front end of the center bar 1 being connected by a plurality of upright braces 5 to an upper front supporting bar 6, said bar being connected at its outer end to the upper plate or member 7 of a steering head 8 the lower plate or member 9 of which is spaced apart and loosely connected with the upper plate by a series of depending guide pins 10 on which and between the plates 7 and 9 are arranged coiled springs 11 whereby said plates are spaced apart and the upper plate 7 and forward end of the frame is yieldingly supported on the front steering fork of the machine which will be hereinafter more fully described.

On the rear end of the center bar 1 is arranged a bearing 12 in which and in the bearings 3 on the ends of the bearing frame 2 is revolubly mounted the driving and supporting axle 13 of the machine. The axle 13 for a greater part of its length is square or rectangular in cross section and where the same passes through the bearings it is reduced and formed cylindrical to freely revolve in the bearings as shown. The ends of the axle are also reduced to form cylindrical spindles on which the supporting wheels 14 and 15 are loosely mounted. The right hand wheel 14 of the vehicle has formed in the inner side of its hub, segmental grooves 16 with which are adapted to be engaged studs 17 formed on a clutch member 18, said member being in the form of a cylindrical block having a reduced cylindrical extension 19 with which is loosely engaged a clutch shifting arm 20 said arm being secured in operative engagement with the clutch member by a plate or disk 21 secured to the reduced extension of the clutch member by screws or other suitable fastening means as shown. On the forward end of the arm 20 is formed a guiding and supporting finger 22 which is slidably engaged with a slotted arm supporting bracket 23 secured to the front portion of the bearing frame 2 as shown.

The arm 20 is actuated and normally forced outwardly to engage the block or clutch member 18 with the hub of the wheel 14 by a shifting rod 24. The rod 24 is formed in sections which are pivotally connected together as shown at 25 and said rod is slidably supported in brackets or hangers 26 secured to the frame of the machine. Between the outer bracket or hanger 26 and the inner side of the arm 20 is arranged a coiled spring 27 the pressure of which is exerted to shift and hold the clutch member 18 in operative engagement with the hub of the wheel. The shifting rod 24 is provided with a suitable operating mechanism comprising a lever 29 which is pivotally secured between its ends to the rod 24 and has one end loosely connected by a link 30 to the adjacent side of the center bar 1 of the frame. To the opposite end of the lever 29 is connected a cable or flexible operating element 31 which passes over a guide pulley 32 and is connected with a foot lever 33 pivoted to the frame of the machine as shown. The lever 33 extends upwardly through a slot in the platform of the vehicle and is provided with a treadle 34 whereby the lever may be actuated by the foot of the operator to shift the rod 24 and thereby retract or disengage the clutch member 18 from the hub of the wheel and against the pressure of the spring 27, thus permitting the wheel 14 to run loose or revolve on the spindle of the shaft. By loosely mounting the wheel 14 on the spindle of the axle and providing the clutch mechanism as herein shown and described the wheel is normally locked to the axle and may be quickly released and permitted to run loose when making short turns or passing around corners. The wheel 15 on the left hand side of the machine is also loosely mounted on the spindle of the axle, said wheel having formed in the inner side of its hub segmental grooves 35 with which are adapted to be engaged the studs 36 of a stationary clutch member 37, said member comprising a block which is engaged with and rigidly secured to the square portion of the axle adjacent to the inner side of the hub of the wheel 15 as shown. The wheels are secured on the spindles of the axle by washers 38 and cotter pins 39 and with the outer ends of the hubs are preferably engaged caps 40, said caps being screwed into engagement with the outer ends of the hubs as clearly shown in Fig. 12 of the drawing.

The front end of the machine is supported on a steering wheel 41 which is revolubly mounted in the lower end of a steering fork 42, said fork having a reduced upper end or stem 43 which is revolubly engaged with the head 9, said stem passing through bearing apertures in the upper and lower plates 7 and 9 of the head. The upper end of the stem 43 projects a suitable distance above the upper plate 7 and has fixedly secured thereto a cross head 44, said head being secured to the stem between upper and lower nuts or collars 45 as shown. To the ends of the cross head are connected the bifurcated outer ends of steering rods 46 which extend rearwardly and are connected to the opposite sides of a steering wheel 47 revolubly mounted on the upper end of a wheel supporting post 48 secured to the center bar 1 and the inner end of the upper front bar 6 of the frame. The wheel 47 has secured to and spaced from the lower side of the front portion thereof a segmental rod supporting plate 49 on which the inner ends of the rods 46 are supported. The wheel is provided with a series of handles or grips 50 whereby the same may be readily turned by the operator or occupant of the machine.

Arranged above and spaced a suitable distance from the bearing frame 2 is a platform and seat supporting frame 51. On the frame 51 is secured a platform 52, a seat 53 and utility boxes 54, said boxes being provided with suitable covers adapted to contain tools or other miscellaneous articles. The frame 51 is secured to a centrally disposed connecting bar 55 the forward end of which is bifurcated and is pivotally secured to the lower portion of the steering wheel post 48. The frame 51 is yieldingly supported a suitable distance above the bearing frame 2 by a plurality of coiled springs 56 which are arranged between the side bars of said frames and are held in position by guide pins 57 secured to the lower side of the side bars of the frame 51 and have a sliding engagement with guide passages formed in the side bars of the bearing frame 2. The lower ends of the pins are prevented from becoming disengaged from the guide passages in the frame 2 by cotter pins or other suitable devices 58 arranged through the lower ends of the guide pins as shown. The rear end of the platform 52 is inclined in opposite directions from the center of the machine toward the sides of the frame 51 and said elevated central portion of the platform is supported above the connecting bar 55 of the seat frame by a spacing strip 59 and the rear ends of the frame 51 and platform are connected together by a cross bar 60. By this construction and arrangement of the rear portion of the platform the same constitutes a truss brace and forms a firm support for the seat and elevates the latter a suitable distance above the front portion of the platform as shown. To the ends or sides of the frame 51 are secured fender supporting frames 61 to the upper ends of which are secured rear wheel fenders 62.

Loosely mounted on a reduced cylindrical portion of the axle is a master or main driving sprocket 63 said sprocket being formed in two semi-circular sections whereby the same may be engaged with the reduced bearing portion of the axle. The sections of the sprocket gear 63 are securely fastened together and in engagement with the axle by two semi-circular connecting plates 64 which are secured to one side of the gear transversely to the wheel whereby said of the sections of the wheel securely fastened together to form the gear. In the opposite side of the sprocket gear from that to which the plates 64 are secured are formed segmental grooves 65 with which are engaged the studs 66 of a clutch member 67, said clutch member being in the form of a cylindrical block having a square passage formed therethrough whereby said block is slidably engaged with the adjacent square portion of the axle. On the opposite side of the clutch member from the studs 66 is formed a reduced cylindrical extension with which is engaged the rear end of a clutch shifting arm 69, said arm being secured in loose engagement with the extension 68 by a plate 70 secured to the extension in any suitable manner. On the axle and spaced a suitable distance from the outer side of the clutch member 67 is a stop collar 71 whereby the outward movement of the clutch member is limited.

The clutch shifting arm 69 is actuated to shift and normally hold the clutch 67 in operative engagement with the spindle gear 63 to lock the latter to the axle by a coiled spring 72 which is arranged on and has one end secured to a guide rod 73 and the other end secured to the adjacent side of the center bar 1 of the frame. The guide rod 73 has one end secured to the arm 69 and the other end slidably engaged with a guide passage 74 formed in the bar 1 as shown. The forward end of the arm 69 is slidably engaged with and supported in a guide slot 75 formed in the front bar of the bearing frame 2.

The clutch shifting arm is actuated to disengage the clutch member 67 from the sprocket gear 63 by a shifting mechanism comprising a rock shaft 76 one end of which is revolubly secured to the arm 69 while the opposite end thereof is reduced and has a sliding and revoluble engagement with a bearing aperture in the adjacent side of the center bar 1 as shown in Fig. 7 of the drawings. On the shaft 76 adjacent to the bar 1 is formed a right angular clutch shifting lug 77, which when the shaft is rocked is adapted to be brought into engagement with a cam projection 78 formed on the adjacent portion of the bar 1 whereby when said shaft is rocked the engagement of the lug 77 with the cam projection 78 will force the shaft together with the clutch shifting arm 69 and the clutch member 63 laterally against the resistance of the spring 72, thus disengaging the clutch member from the sprocket gear and releasing the latter from the axle 13. The shaft 76 is rocked by means of a crank arm 79 projecting upwardly therefrom, said arm being connected at its upper end by a link 80 with a foot lever 81 which projects upwardly through a slot in the platform 52 and is provided on its upper end with a treadle 82 to which is loosely connected a pawl 83, said pawl being adapted to engage a notched plate 84 secured to the platform whereby the lever is held in the position to which it has been adjusted by the foot of the operator. By thus constructing and arranging the clutch 67 and its operating mechanism the sprocket gear 63 may be quickly and easily thrown out of gear to stop the machine without stopping the motor.

The sprocket gear 63 is connected by a sprocket chain 85 to a driving sprocket 86 fixed on one end of a drive shaft 87 of the motor 88 of the machine. The motor 88 may be of any suitable construction and is here shown and is preferably in the form of a gasolene engine and is secured in the seat 4 arranged on the forward end of the center bar 1 of the frame and has its upper end suitably secured to the upper front bar 6 of the frame as shown. Secured to the upper frame bar 6 are laterally projecting bearing brackets 90 having in their ends bearing apertures. With the bearing apertures in one end of the brackets 90 is revolubly mounted a threaded valve operating rod 91 having on its outer end a crank arm 92 which is secured by a link 93 with the stem or lever 94 of the throttle valve of the engine by means of which the supply of fuel to the carbureter of the engine is controlled. In the bearing apertures in the opposite ends of the brackets 90 is revolubly mounted a spark controlling rod 95 having on its forward end a crank arm 96 which is connected by a link 97 with the sparking mechanism of the motor whereby the latter is controlled. On the inner ends of the rod 91 is arranged a hand wheel 98 while on the inner end of the rod 95 is arranged a hand wheel 99, said wheels being disposed within convenient reach of the driver or occupant of the machine whereby the fuel supply and sparking mechanism of the machine may be readily controlled by the driver.

Fixedly mounted on the axle 13 at one side of the center of the machine is a brake disk or wheel 100, said wheel being preferably provided in its periphery with an annular V-shaped groove with which is adapted to be engaged a tapered segmental brake block 101 secured to a brake bar 102 pivoted at one end to the rear end of the bearing frame 1 and having its opposite end reduced and slidably engaged with a guide opening formed in the bifurcated bracket 103 on the rear end of the center bar 1 of the frame as shown. The end of the bar 102 is limited in its outward movement in the bracket 103 by a stop pin 104 arranged in the outer end of the bracket as shown. Adjustably connected to the inner end of the brake bar 102 is a brake operating rod 105 the forward end of which is pivotally connected to a brake lever 106 loosely connected at its lower end to the front bar of the bearing frame 2 and having its upper end projecting upwardly through a slot in the platform 52. The upper end of the lever 106 is provided with a treadle 107 to which is loosely connected a foot operating pawl 108 which is adapted to be engaged with a notched plate 109 whereby the lever is held in its adjusted positions. To the foot lever 106 is secured an upwardly projecting extension which forms a hand lever 110 whereby the foot lever may be actuated by hand to apply the brake when desired.

Secured to the opposite sides of the front bar of the bearing frame 2 are suitable steps 111, while to the platform 52 at the ends of the box 54 are secured upwardly projecting posts 112 which form handles to aid in getting into and out of the vehicle. To the steering fork 42 is secured a front wheel guard or fender 113 which, with the rear wheel fenders effectually prevent mud from being thrown by the wheels onto the machine or occupant thereof. Secured to posts 114 and spaced a suitable distance above the upper frame bar 6 is a tank supporting plate 115 on which is arranged a fuel tank 116, said tank being suitably connected to the engine.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In a motor vehicle, a frame composed of a wide rear portion upon which the drive wheels of the vehicle are mounted, a seat disposed between the said drive wheels, a beam projecting from said wide portion, a yielding head rigidly carried by the forward end of said beam, a single wheel mounted in the depending forks of said head, a steering wheel mounted at the juncture of the broad portion and parallel beam projecting therefrom and adjacent to the seat, whereby the front wheel is properly directed, a motor carried by the frame located between the drive wheels and the steering wheel and depending from the said frame, a fuel tank arranged above said motor, whereby the vehicle is properly manipulated and balanced, a clutch mechanism adapted for engagement with the rear axle of the machine, whereby the same is adapted to be controlled below the steering wheel, and an operating mechanism also located immediately below the steering wheel but disconnected therefrom, whereby the fuel supply may be readily controlled by the driver.

2. In a motor vehicle a frame comprising beams, bearings on said beams, an axle journaled in said bearings, a sprocket wheel loosely journaled on the axle provided with segmental slots, a disk non-rotatable on the axle provided with pins to enter said segmental slots, a lever having one end attached to the disk, a spring for actuating said lever to normally and yieldingly hold the pins in the segmental slots, a rock shaft slidable on the central longitudinal beam and bearing against the lever, a lug and an arm projecting upwardly and downwardly respectively, means for actuating the arm to rock the shaft, and a cam on the central beam engaged by the lug when the rock shaft is turned, thus sliding the rock shaft and moving the lever against the stress of the spring to actuate the clutch disk.

In testimony whereof I have hereunto set my hand in presence of two subscribing witnesses.

NATHAN C. WHITING.

Witnesses:
L. R. ANDREWS,
S. S. CARPENTER.